United States Patent [19]

Rubino

[11] Patent Number: 4,491,085
[45] Date of Patent: Jan. 1, 1985

[54] SUPPORT ARM FOR A MILK HOSE

[75] Inventor: Daniel A. Rubino, Elmhurst, Ill.

[73] Assignee: Babson Bros. Co., Oak Brook, Ill.

[21] Appl. No.: 517,736

[22] Filed: Jul. 28, 1983

[51] Int. Cl.³ .......................... A01J 7/00; A01J 9/08
[52] U.S. Cl. ................................. 119/14.1; 119/14.08
[58] Field of Search .................. 119/14.01, 14.08, 14.1, 119/14.12, 14.13

[56] References Cited

U.S. PATENT DOCUMENTS

| | | | |
|---|---|---|---|
| 2,136,228 | 11/1938 | Babson et al. | 119/14.1 |
| 3,033,161 | 5/1962 | Babson | 119/14.13 |
| 3,556,053 | 1/1971 | Padman | 119/14.08 |
| 3,603,292 | 9/1971 | Finch | 119/14.1 |
| 3,690,300 | 9/1972 | Tonelli | 119/14.08 |
| 3,789,798 | 2/1974 | Reisgies et al. | 119/14.08 |
| 3,814,056 | 6/1974 | Maehans | 119/14.08 |
| 3,861,355 | 1/1975 | Johnson et al. | 119/14.08 |
| 3,893,422 | 7/1975 | Schnitzler et al. | 119/14.08 |
| 3,929,103 | 12/1975 | Schluckbier | 119/14.08 |
| 3,938,470 | 2/1976 | Pace | 119/14.1 |
| 3,962,575 | 6/1976 | Vandenberg et al. | 119/14.1 X |
| 3,973,520 | 8/1976 | Flocchini | 119/14.08 |
| 4,188,910 | 2/1980 | Hocker | 119/14.08 |
| 4,228,763 | 10/1980 | Heidecker et al. | 119/14.08 |
| 4,228,764 | 10/1980 | Plett | 119/14.08 |
| 4,333,421 | 6/1982 | Schluckbier | 119/14.08 |

OTHER PUBLICATIONS

Surge HTO Milking System brochure (published at least as early as Nov., 1980)

Primary Examiner—Hugh R. Chamblee
Attorney, Agent, or Firm—Wood, Dalton, Phillips, Mason & Rowe

[57] ABSTRACT

A support structure for an arm adjustably supporting a hose at a stall of a cow milking system is disclosed. The structure includes a leg carried by a ball and having a tubular section within which the arm may be adjustably secured. The ball is received in a bracket permitting universal rotation with respect to the stall, the bracket frictionally securing the ball in whatever position it is placed. The arm may be moved manually or may be moved automatically by a retractor cylinder activated upon the completion of milking.

8 Claims, 4 Drawing Figures

U.S. Patent  Jan. 1, 1985  4,491,085
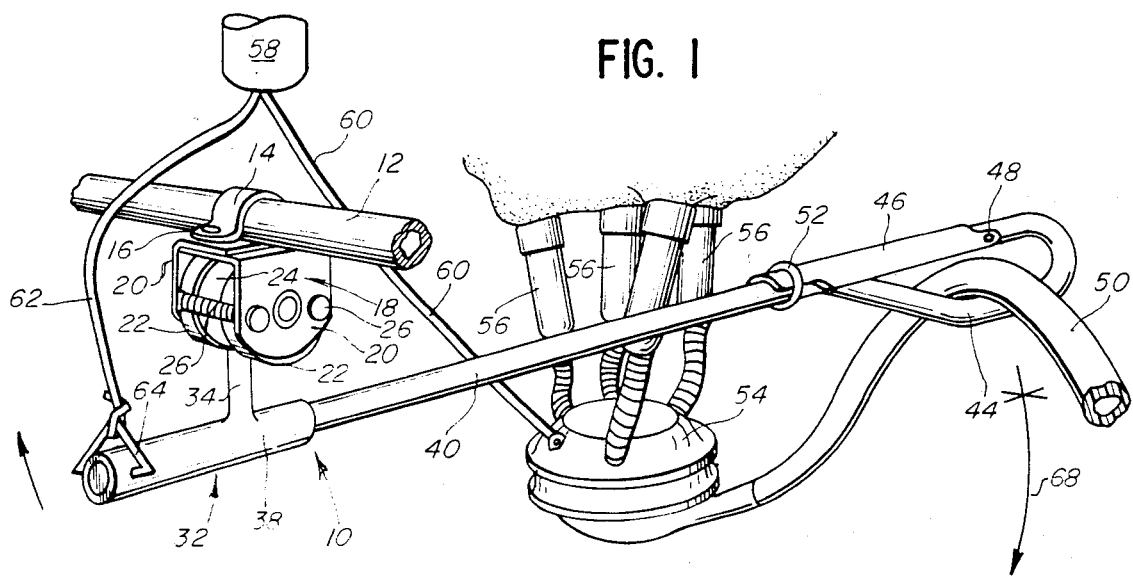
FIG. 1
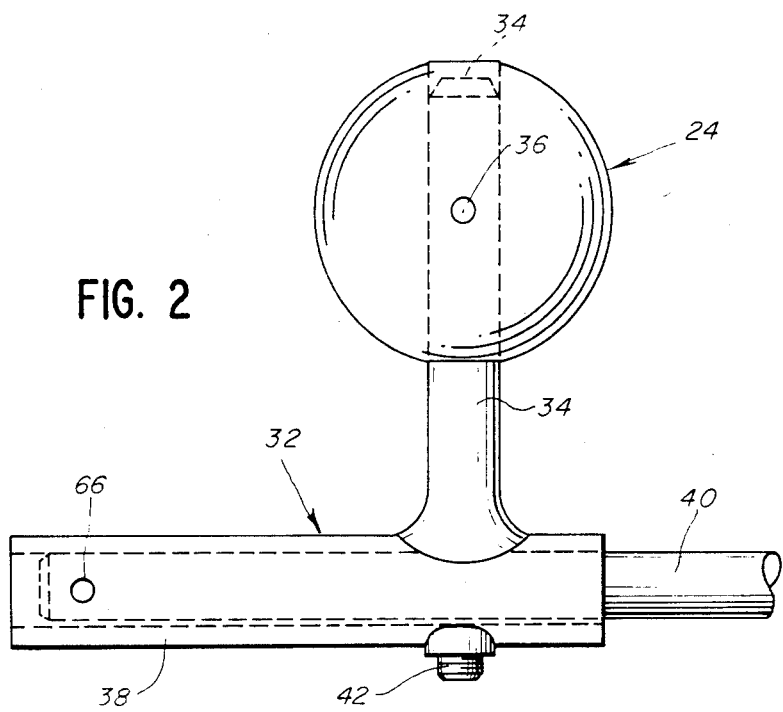
FIG. 2
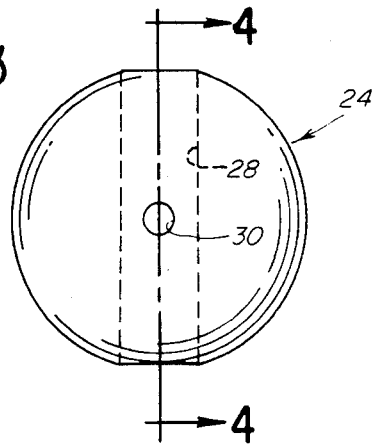
FIG. 3
FIG. 4

SUPPORT ARM FOR A MILK HOSE

BACKGROUND OF THE INVENTION

Technical Field

This invention relates to a support arm structure for the milk hose of a cow milking machine.

Background Art

In a typical milking system, the milker in each milking stall is connected through a milk hose with an evacuated milk pipe line. The milker and hose are positioned in the stall and beneath the cow for milking. Retraction of the hose when the milker is detached from the cow is desirable so that it will be moved back out of the way when cows move into or out of the stall. It is desirable to support the hose above the floor at all times, both during and between milkings, so that it will not be stepped on and damaged.

In the prior art, support arms have been used which support the hose for each stall and which may be manually moved by the farmer to retract the hose when desired. However, these prior art support arms have generally been of a specific length and have not been readily adjustable in length to account for the variations between milking systems and between individual stalls. Still further, these systems which have required manual retraction of the arm, impose an additional work load on the operator which can slow the rate at which the operator can replace cows in the stalls.

Supports have also been provided in the prior art which will automatically retract the hose and/or milk bowl on the end of the hose. Such supports are shown for example in U.S. Pat. Nos. 3,603,292, 3,861,355, 3,893,422 and 4,228,764.

However, the structures of these prior art devices have been relatively complex and, accordingly, undesirably expensive. Further, the amount of extension and retraction provided by many of those structures is not readily adjustable to account for different stall sizes and arrangements.

The present invention is directed toward overcoming one or more of the problems as set forth above.

SUMMARY OF THE INVENTION

In one aspect of the present invention, a support for an arm adjustably carrying a milk hose is disclosed. The structure includes a leg carried by a ball and having a tubular section within which the arm may be adjustably secured. The ball is received in a bracket permitting universal rotation with respect to the stall, the bracket frictionally securing the ball in whatever position it is placed. The arm may be moved manually or may be moved automatically by a retractor cylinder activated upon the completion of milking.

One object of the present invention is to provide a structure whereby a support arm for a milking system may be easily mounted at whatever length may be desired for the particular application. A further object is to provide a simple yet effective structure which supports a milking hose in extended and retracted positions with respect to a milking stall. Still another object of the present invention is to provide a system whereby the hose may be easily extended into a cow stall and supported therein and also automatically retracted from the cow stall upon the completion of milking.

BRIEF DESCRIPTION OF THE DRAWINGS

FIG. 1 is a perspective view of the hose support arm structure;
FIG. 2 is a view of the arm support and ball;
FIG. 3 is a view of the ball; and
FIG. 4 is a cross-sectional view taken along line 4—4 of FIG. 3.

DESCRIPTION OF THE PREFERRED EMBODIMENT

The milking hose carrier arm structure 10 of the present invention is shown in FIG. 1. The carrier arm structure 10 is mounted on a stall side rail 12 of a cow milking stall by suitable means, as for example by a U-shaped bracket 14 having outwardly extending flanges 16 which are bolted or otherwise secured to a mounting bracket 18. The mounting bracket 18 has downwardly extending side walls 20 which each support a concave member 22. A ball 24 (see FIGS. 2-4) made of a material such as glass-filled nylon is frictionally supported between the concave members 22. Bolts 26 are secured between the side walls 20 of the mounting bracket 18 and are tightened to bias the concave members 22 together so that the ball 24 is frictionally held between the concave members.

The ball 24 includes a pair of perpendicular radial holes 28,30 therein (see FIG. 4). The arm mounting 32 is secured to the ball 24 by inserting its leg 34 in one hole 28 and extending a shear pin 36 (see FIG. 2) through the leg 34 and other hole 30. Accordingly, the arm support is fixed to and will pivot with the ball 24.

The arm mounting 32 includes a tubular portion 38 in which the supporting arm 40 may be adjustably secured. The supporting arm 40 may be moved through the tubular portion 38 to readily obtain the desired arm length, which depends upon the location where it is mounted. A set screw 42 is used to lock the arm 40 within the tubular portion at the desired position.

The end of the arm 40 includes a hook portion 44 with a latch 46 pivotable around a pin 48 so that the latch 46 will open to locate a hose 50 in the hook portion 44 and close to hold the hose 50 in the hook portion 44 (as shown in FIG. 1). An O-ring 52 is used to secure the latch 46 in the closed position.

The arm structure 10 thus operates to support a hose 50 of a cow milking machine, a milk bowl 54 with teat cups 56 being on the end of the hose 50. When a cow is being milked, the hose 50 and milk bowl 54 must be extended out into the stall and beneath the cow. The supporting arm 40 holds the hose 50 up off the floor to protect it from being stepped on by the cow and thereby damaged. However, after milking of a cow is completed, the milk bowl 54 and hose 50 must be retracted out of the stall so as to not interfere with, or be damaged by, the movement of the milked cow out of and a different cow into the stall.

The farmer/operator may move the hose 50 out of the way by pivoting the supporting arm 40 with the ball 24 in whatever direction will retract the hose 50. The frictional forces holding the ball 24 between the concave members 22 are sufficient to hold the carrier arm structure 10 in whatever position it is placed while still enabling the structure 10 to be pivoted when desired. The bolts 26 are tightened sufficiently to create the required friction forces. Thus, the farmer may manually pivot the supporting arm 40 to support the hose 50 in any desired position clear of the stall.

The arm 40 may also be automatically retracted at the completion of milking. As is known in the art, a retractor cylinder 58 mounted to the cow stall in any suitable manner is connected by a cord 60 to the milk bowl 54. The vacuum to the hose 50 and milk bowl 54 is shut off upon detection of the completion of milking (e.g. when the milk flow reduces to approximately 0.6 lbs. per minute), thereby causing the teat cups 56 to release the suction on the cow teats. After a short delay, the retractor cylinder 58 is activated to pull the milk bowl 54 free of the cow, suspended on the cord 60 at the side of the stall.

As shown in FIG. 1, the support arm structure 10 may also be connected to the retractor cylinder 58 so as to automatically retract the hose 50 at the same time. Specifically, a second retraction cord 62 of the retractor cylinder 58 is connected to the end of the arm mounting 32 by tying it to a D-ring 64 located in a hole 66 (see FIG. 2) in the tubular portion. This D-ring 64 connection avoids abrasion on the cord 62. Accordingly, when the retractor cylinder 58 is activated upon completion of milking, the supporting arm 40 is pivoted with the ball 24 in the direction of the arrow 68 to move the arm 40 and supported hose 50 down and clear of the stall. Of course, alternative connections and arrangements by which the retraction cord 62 can pivot the supporting arm 40 free of the stall will be apparent to skilled artisans having an understanding of the illustrated embodiment.

Other aspects, objects and advantages of the present invention will be apparent from a study of the drawings, the specification and the appended claims.

I claim:

1. In a support for the milk hose of a milker, the support having a mounting bracket and a ball carried by the bracket for universal rotation, an improved adjustable hose carrier, comprising:
 a leg secured to said ball and having a tubular section on its end; and
 a hose support arm adapted to support the milk hose on one end and having its other end received in one end of said tubular section and adjustable in position with respect thereto;
 wherein the other end of the tubular section extends beyond the leg and clear of the mounting bracket and ball.

2. The support structure of claim 1, further comprising a set screw for securing said arm in said tubular section.

3. The support structure of claim 1, further comprising means for securing the other end of said tubular section to an automatic retraction device for moving said arm to retract said hose away from the cow at the completion of milking.

4. The support structure of claim 3, wherein said securing means comprises a cord.

5. A carrier arm structure for supporting the milk hose of a milker above the floor and free of a stall when milking of a cow in the stall is completed, comprising:
 a bracket fixed to said stall;
 a ball supported in the bracket for universal rotation, said bracket frictionally holding said ball in whatever rotational position it is placed;
 a leg fixed to said ball and rigidly supporting a tubular section, said tubular section having one end extending clear of said ball and bracket; and
 an arm adjustably secured within said tubular section with one end projecting from the other tubular section end, said arm adapted to support a hose on its projecting end.

6. The arm structure of claim 5, wherein a retractor cylinder associated with the stall is connected by a first flexible member to a milk bowl on the end of said hose to retract said bowl when milking is completed, said carrier arm structure further comprising a second flexible member connecting said tubular section to said retractor cylinder, said second flexible member pulling on said tubular section to pivot said arm with said ball to retract said hose from said stall when milking is completed.

7. The arm structure of claim 6, wherein said second flexible member comprises a cord.

8. The arm structure of claim 6, wherein said leg supports said tubular section at a location intermediate the hose supporting end and the second flexible member.

* * * * *